US006948605B1

(12) United States Patent
Gauthier

(10) Patent No.: US 6,948,605 B1
(45) Date of Patent: Sep. 27, 2005

(54) RATCHETING MECHANISM

(75) Inventor: Michael T. Gauthier, Oak Creek, WI (US)

(73) Assignee: Gauthier Biomedical Inc., Brown Deer, WI (US)

(*) Notice: Subject to any disclaimer, the term of this patent is extended or adjusted under 35 U.S.C. 154(b) by 0 days.

(21) Appl. No.: 10/969,402

(22) Filed: Oct. 20, 2004

Related U.S. Application Data

(63) Continuation of application No. 10/342,707, filed on Jan. 15, 2003, now Pat. No. 6,817,458.

(60) Provisional application No. 60/348,516, filed on Jan. 16, 2002.

(51) Int. Cl.[7] ........................ F16D 11/06; B25B 13/46

(52) U.S. Cl. ........................................ 192/43.1; 81/62

(58) Field of Search ........................ 192/43.1, 43, 43.2; 81/61, 62, 63, 63.1

(56) References Cited

U.S. PATENT DOCUMENTS

| | | | | |
|---|---|---|---|---|
| 2,720,296 | A * | 10/1955 | Anton | 192/43.1 |
| 2,867,144 | A * | 1/1959 | Stevens | 81/470 |
| 2,893,278 | A * | 7/1959 | Rice | 81/467 |
| 3,654,975 | A * | 4/1972 | Ballsmith et al. | 81/32 |
| 4,466,523 | A * | 8/1984 | De Carolis et al. | 192/43.1 |
| 5,437,212 | A * | 8/1995 | Thompson et al. | 81/63.1 |
| 5,520,073 | A * | 5/1996 | Bakula et al. | 81/63.1 |
| 5,535,648 | A * | 7/1996 | Braun et al. | 81/63.1 |
| 5,551,323 | A * | 9/1996 | Beere et al. | 81/489 |
| 5,613,585 | A * | 3/1997 | Tiede | 192/43.1 |
| 5,619,891 | A * | 4/1997 | Tiede | 81/62 |
| 5,622,089 | A * | 4/1997 | Gifford, Sr. | 81/62 |
| 5,647,252 | A * | 7/1997 | Miner | 81/62 |
| 5,738,192 | A * | 4/1998 | Miner | 192/43.1 |
| 5,749,272 | A * | 5/1998 | Phan | 81/62 |
| 5,771,760 | A * | 6/1998 | Tiede | 81/62 |
| 5,778,743 | A * | 7/1998 | Tiede | 81/62 |
| 5,848,680 | A * | 12/1998 | Rinner | 192/43.1 |
| 5,910,196 | A * | 6/1999 | Huang | 81/60 |
| 5,928,154 | A * | 7/1999 | Silber et al. | 600/459 |
| 5,943,755 | A * | 8/1999 | Gauthier et al. | 29/434 |
| 6,059,083 | A * | 5/2000 | Tseng | 192/43.1 |
| 6,082,226 | A * | 7/2000 | Lin | 81/62 |
| 6,260,446 | B1 * | 7/2001 | Hu | 81/62 |
| 6,305,248 | B1 * | 10/2001 | Rowlay | 81/62 |
| 6,658,970 | B2 * | 12/2003 | Shiao | 81/62 |

* cited by examiner

Primary Examiner—Saul Rodriguez
(74) *Attorney, Agent, or Firm*—Boyle Fredrickson Newholm Stein & Gratz S.C.

(57) ABSTRACT

A ratcheting mechanism for a hand-held tool is provided. The mechanism includes a housing having a central opening and a pair of slots disposed on opposite sides of the opening. Each slot has an arcuate or circular end portion opposite the central opening which circumscribes an arc of greater than 180° in order to pivotally retain a generally circular stem of a pawl therein. Due to the presence of a pair of biasing members within the housing, each pawl is biased inwardly towards the central opening and into engagement with teeth located on the exterior of a gear rotatably disposed within the central opening. A cap rotatably connected to the housing over the pawls and the central opening is able to selectively disengage one of the pawls to allow the rotation of the gear within the central opening in a specified direction.

9 Claims, 4 Drawing Sheets

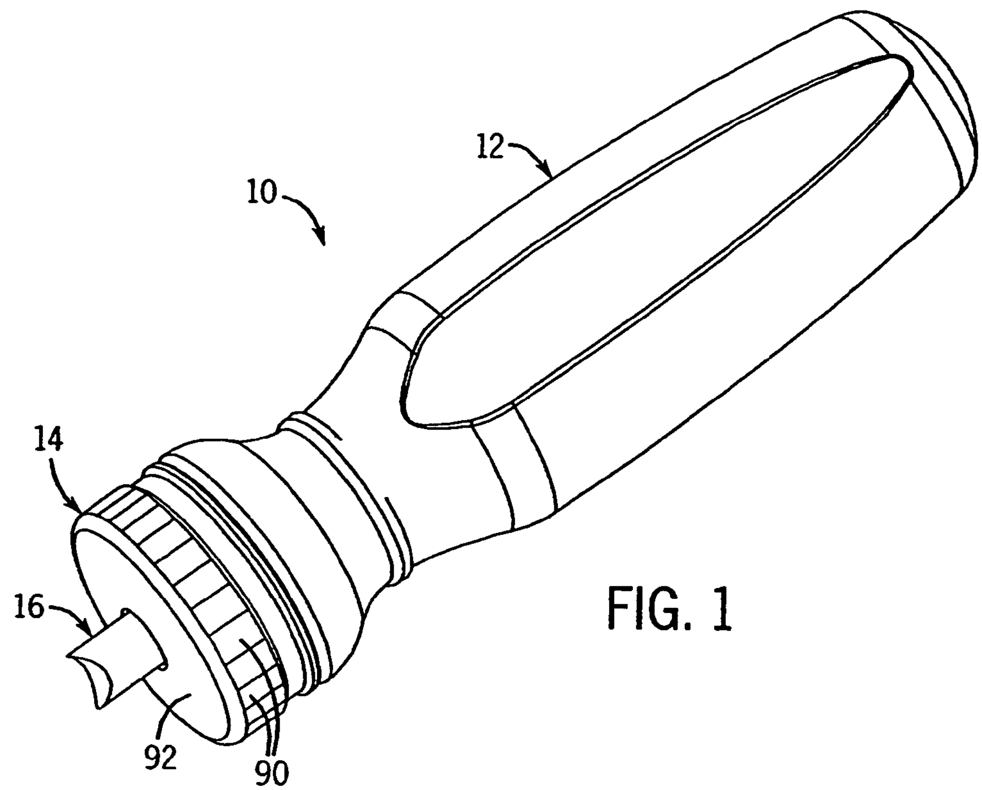
FIG. 1
FIG. 2
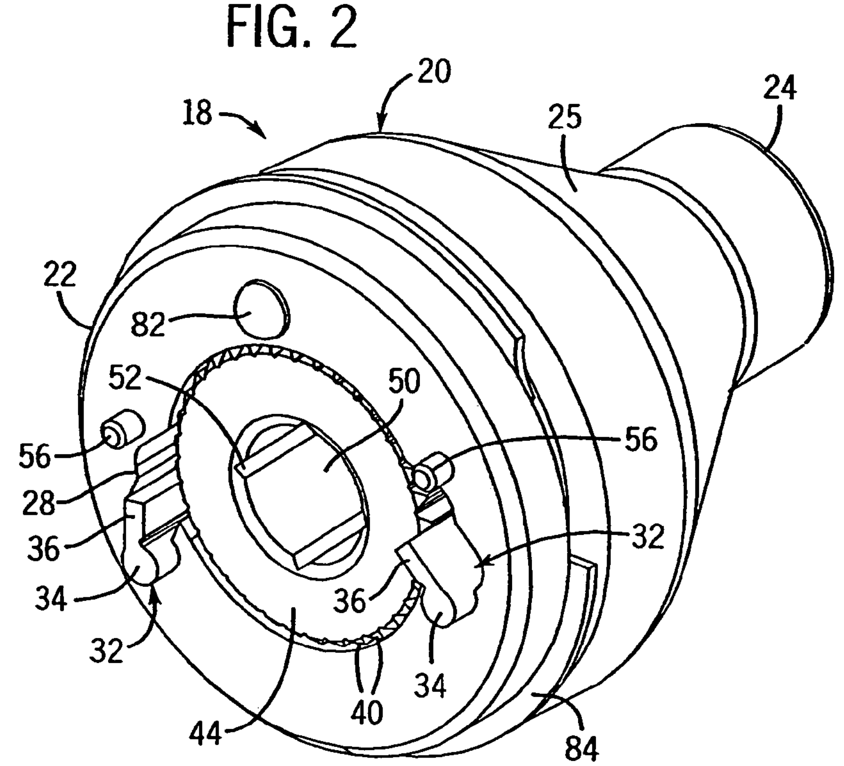

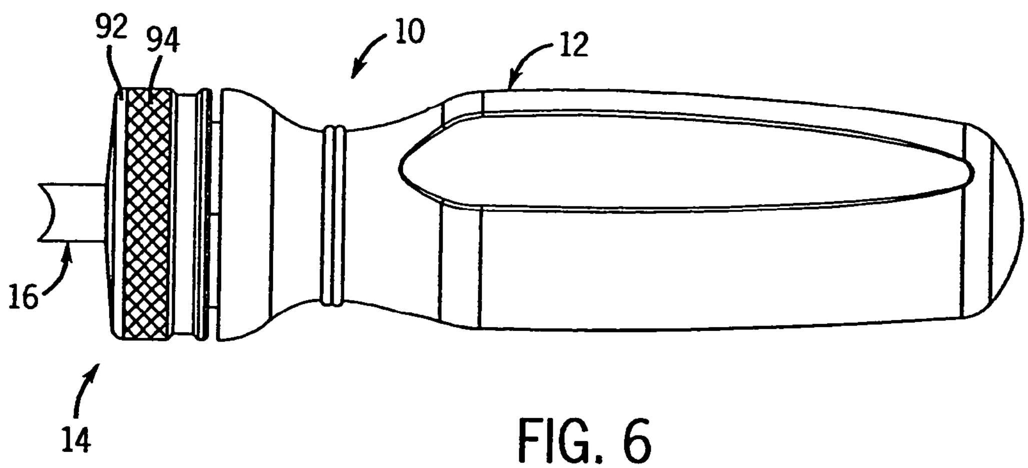
FIG. 6
FIG. 7
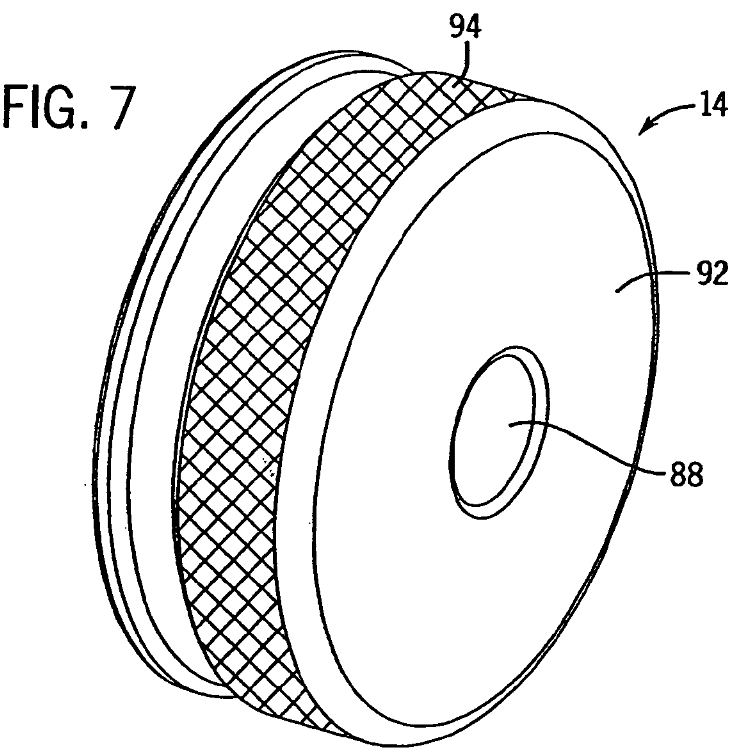
FIG. 8
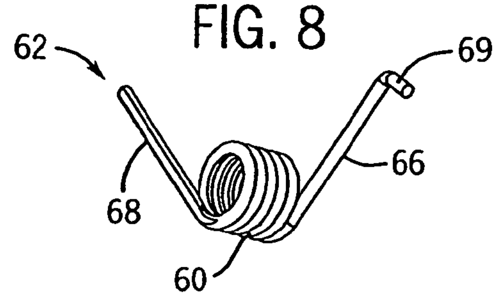

RATCHETING MECHANISM

CROSS-REFERENCE TO RELATED APPLICATIONS

This application is a continuation of application Ser. No. 10/342,707, filed Jan. 15, 2003, now U.S. Pat. No. 6,817, 458, which claims priority from U.S. Provisional Patent Application Ser. No. 60/348,516, which was filed on Jan. 16, 2002.

FIELD OF THE INVENTION

The present invention relates to a ratcheting mechanism, and more specifically to a ratcheting mechanism for use in a hand-held tool.

BACKGROUND OF THE INVENTION

Screwdrivers and other hand-held tools are often utilized to insert, remove and/or adjust fasteners attached to various items. The tool is used to rotate the fasteners into or out of apertures in the items to properly position the fasteners with respect to the items.

In order to make the rotation of the fasteners easier when utilizing these tools, the tools often include ratcheting mechanisms which enable the tool to apply a force to the fastener when the tool is rotated in one direction, and to allow the tool to rotate freely without applying a force to the fastener in the opposite direction. Ratcheting mechanisms of this type take various forms, such as those disclosed in U.S. Pat. Nos. 5,613,585; 5,619,891; 5,778,743; 5,873,288; and 5,943,755. In each of these mechanisms, a pair of pawls are disposed within a housing for the tool. The pawls can be selectively engaged and disengaged from a toothed gear disposed within the tool housing in order to enable the gear to rotate in a specified direction to achieve the desired mechanical advantage when adjusting, inserting or removing a fastener.

However, while tools incorporating ratcheting mechanisms of this type are useful in adjusting, inserting and removing fasteners from various items, the mechanisms also have certain drawbacks. For example, due to the shape of the pawls and the corresponding placement of the pawls within the housing, prior art ratcheting mechanism constructions are unable to handle large amounts of torque without the teeth on the gear slipping past the pawls. Thus, for fasteners that are very tightly engaged with an item, mechanisms of this type effectively cannot be used to adjust, insert or remove the fasteners. Additionally, due to the large size and consequent spacing of the teeth on the gear, the tool must be rotated more than approximately 10° in order to advance the ratcheting mechanism to the next locking position. In situations where precise movements of a fastener are necessary, the tools incorporating mechanisms of the above-referenced type with gears of this size are not suitable as these mechanisms are very "coarse" and do not allow for precise movements of the fastener. Further, the prior art ratcheting mechanisms require a large number of parts to be assembled within the housing in order to complete the ratcheting mechanism, increasing the time and expense necessary for manufacturing tools incorporating these prior art ratcheting mechanisms.

Therefore, it is desirable to develop a ratcheting mechanism for hand- held tools that has a simple and easy to assemble construction, and that also provides the tool with the ability to easily and precisely adjust the position of a fastener on an item, no matter how securely the fastener is engaged with the item.

SUMMARY OF THE INVENTION

It is an object of the present invention to provide a ratcheting mechanism for a tool in which the pawls for the ratcheting mechanism are rotatably retained within elongate, arcuate slots positioned in a housing for the mechanism to enable the mechanism to accommodate large amounts of torque exerted on the mechanism without the mechanism slipping on the fastener.

It is another object of the present invention to provide a ratcheting mechanism for a tool in which the biasing members used to maintain the pawls in engagement with a toothed gear in the mechanism have an easily-assembled construction.

It is a further object of the present invention to provide a ratcheting mechanism for a tool in which the pawls and the biasing members are reliably positioned and retained within spaces formed directly in the housing for the mechanism without the need for any additional fasteners.

It is still another object of the present invention to provide a ratcheting mechanism for a tool including a rotatable gear having a large number of reduced-size teeth that allow the rotation of the mechanism and an associated fastener to be precisely controlled in order to accurately position the fastener.

It is still a further object of the present invention to provide a ratcheting mechanism for a tool which can be incorporated into a wide variety of tools for use in various applications.

The present invention is a ratcheting mechanism for use in a hand-held tool that is utilized to rotate a fastener, such as a screw, nail or bolt, among others, with regard to an item or object in which the fastener is positioned. The mechanism includes a housing that can be attached to or formed as part of a handle that is grasped in order to use the tool. The mechanism further includes a rotatable, toothed gear disposed within the center of the housing that is engaged by a pair of pivotable pawls disposed on opposite sides of the opening. The teeth on the gear are sized and positioned such that the gear need only be rotated a small distance in order to result in a displacement of one full tooth on the gear, i.e., to a successive locking position for the gear.

The pawls on each side of the gear are preferably formed as elongate members that each include a generally circular stem and an arm extending outwardly from the stem that is engageable with the teeth on the gear. The stem is received within an arcuate portion of one of a pair of slots disposed on opposite sides of the gear. The arcuate portions of each slot enclose an angle of greater than 180° such that the stem of each pawl is reliably held within, yet allowed to pivot, easily with respect to, the slot. Each pawl is biased into engagement with the teeth on the gear by a biasing member positioned adjacent the slot and in engagement with the pawl. The biasing member is preferably formed by a pin inserted into an opening in the housing and into engagement with a biasing element extending between the hole for the pin and the slot for the pawl that contacts and biases the pawl into engagement with the gear.

The direction of the rotation of the gear within the housing is controlled by a cap rotatably connected to the housing over the pawls, the biasing members and the gear. The cap includes a pair of opposed recesses that are positioned over the housing in alignment with the pawls. When the cap is rotated in one direction or the other, one of the recesses engages the adjacent pawl to urge the pawl out of engagement with the gear against the bias of the biasing member. Further, because the cap includes a pair of recesses, each selectively engageable with one of the pawls, the cap allows the gear to be rotated in both a clockwise and counterclockwise direction with respect to the housing such that the mechanism allows for driving and removal of the fastener. The cap can also be positioned with respect to the housing such that both pawls are positioned in engagement with the gear in order to maintain the gear in a stationary position within the housing.

Numerous other features, objects and advantages of the present invention will be made apparent from the following detailed description taken together with the drawings.

BRIEF DESCRIPTION OF THE DRAWINGS

The drawings illustrate the best mode currently contemplated of practicing the present invention.

In the drawings:

FIG. 1 is an isometric view of a tool incorporating the ratcheting mechanism of the present invention;

FIG. 2 is an isometric view of the ratcheting mechanism of FIG. 1;

FIG. 6 is a side plan view of the tool including a second embodiment of the cap of FIG. 1;

FIG. 7 is an isometric view of the cap of FIG. 6; and

FIG. 8 is an isometric view of a second embodiment of a spring used in the mechanism of FIG. 2.

DETAILED DESCRIPTION OF THE DRAWINGS

Figure 3:
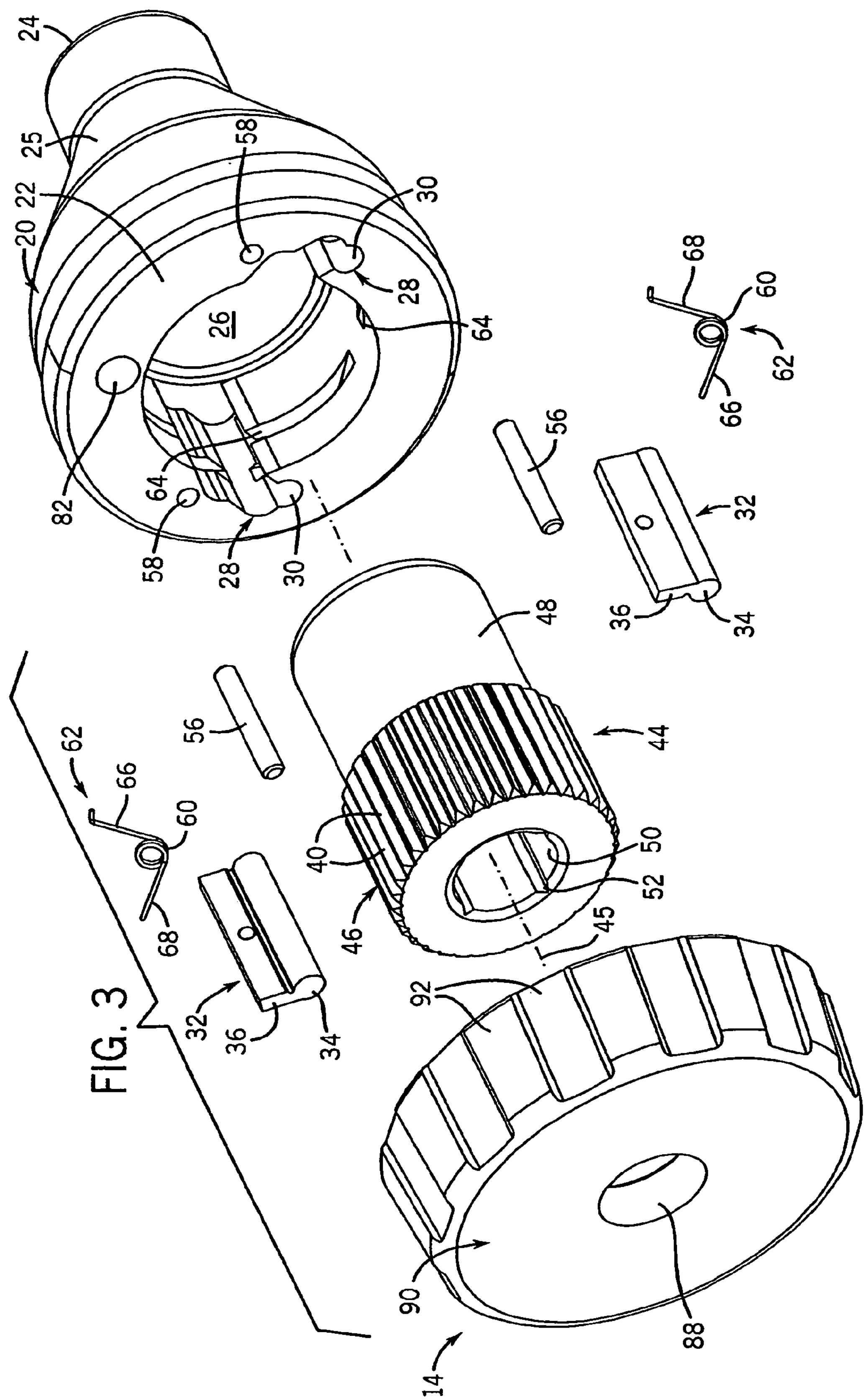
FIG. 3 is an exploded view of the ratcheting mechanism of FIG. 2.

With reference now to the drawing figures in which like reference numerals designate like parts throughout the disclosure, a hand-held tool for positioning a fastener with respect to an object is indicated generally at 10 in FIG. 1. The tool 10 includes a handle 12 that is formed of a generally rigid material that is easily gripped by an individual utilizing the tool 10, such as a metal, a wood, or a hard plastic. The handle 12 is connected to an implement 16 at one end that extends outwardly through a cap 14 rotatably connected to the handle 12 around the implement 16. The implement 16 can be any suitable type of instrument utilized to remove, adjust or tighten a fastener (not shown), such as a Phillips or flathead screwdriver implement, or a ratchet head implement, as is known in the art.

Referring now to FIGS. 2–5, the tool 10 includes a ratcheting mechanism 18 that is disposed within a housing 20. The housing 20 can be formed separately of the same or a similar material as the handle 12, but can also be formed integrally with the handle 12 in a preferred embodiment by machining the various openings formed in the housing 20 directly into the handle 12. In the embodiment where the housing 20 is formed separately from the handle 12, the housing 20 includes a wide first end 22, and a narrow second end 24 joined by a tapering, conical wall 25 which is positioned within the handle 12 and is used to secure the housing 20 to the handle 12. The housing 20 can be fixed to the handle 12 using any suitable means, such as a mechanical fastener (not shown), an adhesive, or any suitable bonding technique such as thermal or sonic welding depending upon the types of materials used to form the handle 12 and the housing 20.

The wide end 22 includes a generally circular central opening 26 that extends inwardly into the housing 20 towards the narrow end 24. A pair of elongate slots 28 are disposed on opposite sides of the opening 26 and extend generally radially and tangentially outwardly from the opening 26. However, the slots 28 can also be offset from one another such that the slots 28 are not aligned or positioned as mirror images of each other. Each slot 28 defines a nesting portion 30 opposite the central opening 26 that is generally circular or arcuate in shape, and circumscribes an arc of greater than 180°. More preferably, the nesting portion 30 encompasses an arc of greater than 200° but not more than 250° to allow for sufficient movement within the portions 30.

The shape of each nesting portion 30 is designed to pivotally receive and securely retain a pawl 32 therein. The pawls 32 are generally elongate members formed of a rigid material, such as a metal or hard plastic, that include a stem 34 having a generally circular cross-section and a diameter slightly less than the inner diameter of the nesting portion 30. The pawls 32 further include an arm 36 extending outwardly from the stem 34 and having a length sufficient to extend from the nesting portion 30 through the remainder of the slots 28 and into the central opening 26. The arm 36 is generally rectangular in shape and includes an outer end 38 that is positionable within the central opening 26. The overall length of the pawl 32 is such that when the pawls 32 are inserted fully into each slot 28 within the housing 20, a portion of each pawl 32 is positioned outwardly of the housing 20 such that the pawls 32 can be engaged by the cap 14 in a manner to be described.

The outer end 38 of the arm 36 of each pawl 32 is positionable within the central opening 26 in order to engage one of a number of teeth 40 disposed on an outer surface 42 of a gear 44 rotatably disposed in the opening 26. The teeth 40 are formed of a size sufficient to enable the gear 44 to be rotated through an angle of about 10° in order to move the width of a single tooth 40. Therefore, the size of the teeth 40 allows for very small movements of the gear 44 with respect to the housing 20 providing a "smooth" feel to the tool 10 so that a fastener engaged by the tool 10 can be very precisely adjusted. Also, because the smaller size for the teeth 40 enables the teeth 40 to be positioned further from a central axis 45 of the gear 44, less stress or force is applied directly to the interface of the pawls 32 and the teeth 40, lessening the chance of the pawls 32 slipping over the teeth 40.

The gear 44 is generally cylindrical in shape including a first section 46 of the outer surface 42 on which the teeth 40 are disposed, and a second section 48.

As best shown in FIG. 3, the outer diameter of the first section 46 of the gear 44 defined by the teeth 40 is slightly less than the inner diameter of the central opening 26, such that the gear 44 can rotate freely within the central opening 26 without interference from the housing 20. The gear 44 further defines a central aperture 50 extending into and through the first portion 46, and including a number of spaced grooves 52 that extend the length of the aperture and which are adapted to receive and engage complementary ridges (not shown) disposed on the implement 16 in order to securely hold the implement 16 within the gear 44 and prevent slipping of the implement 16 with respect to the gear 44.

The gear 44 is effectively prevented from rotating within the central opening 26 of the housing 20 by the engagement of the pawls 32 with the teeth 40 on the gear 44. The pawls 32 are biased into engagement with the teeth 40 by a pair of biasing members 54 disposed on opposite sides of the central opening 26 adjacent each slot 28. Each of the biasing members 54 preferably includes a generally cylindrical pin 56 formed of a rigid material that is inserted into an elongate pin hole 58 located in the housing 20 adjacent each slot 28. The length of each pin 56 is similar to the length of each pawl 32, such that when the pins 56 are inserted into the holes 58, the pins 56 extend outwardly from the housing 20 a short distance.

Figure 4:
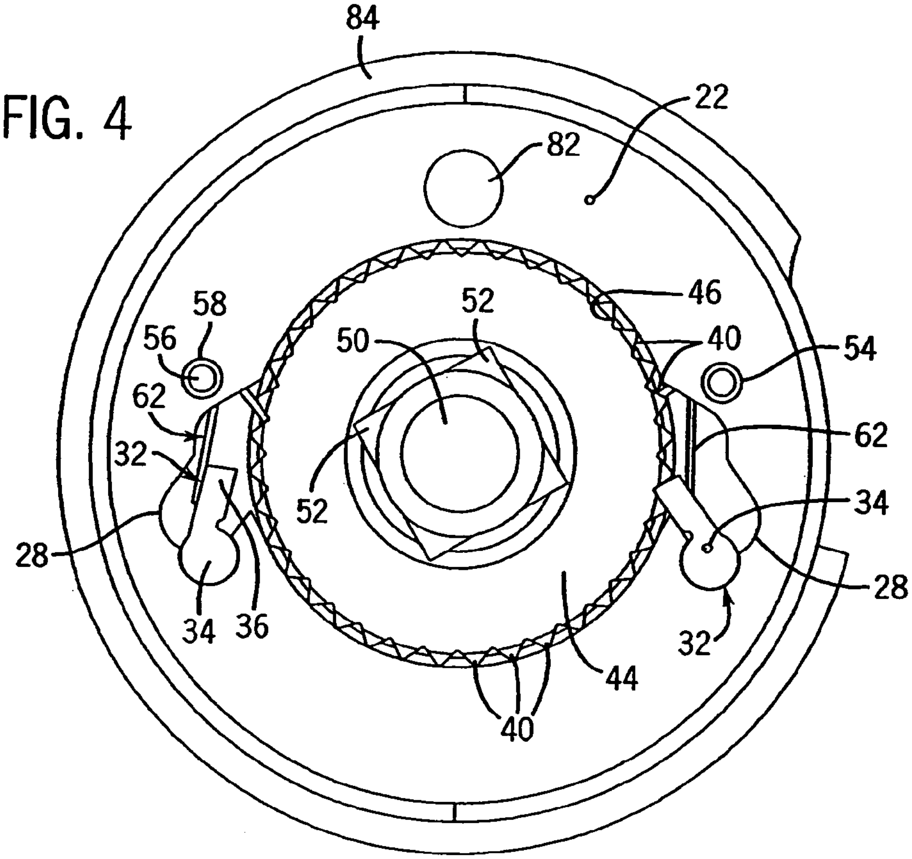
FIG. 4 is a front plan view of the ratcheting mechanism of FIG. 2.

Each pin 56 is inserted through a central, looped portion 60 of a torsion spring 62 in order to anchor the spring 62 within the housing 20. While the spring 62 is a preferred biasing element for use in the biasing members 54, other suitable elements can also be used, such as a resilient, deformable plastic member, or a leaf spring, among others. To anchor the spring 62, the central section 60 is inserted into the pin hole 58 for engagement by the pin 56 through a channel 64 that extends between and intersects both the pin hole 58 and the slot 28. Thus, a first leg 66 of the spring 62 is positioned along the channel 64 between the pin hole 58 and slot 28, while a second leg 68 is biased outwardly by the central portion 60 and first leg 66 into engagement with the pawl 32 as best shown in FIG. 4. The engagement of the second leg 68 with the pawl 32 maintains the outer end 38 of the arm 36 in engagement with the teeth 40 on the gear 44 to prevent rotation of the gear 44 in a direction toward the respective pawl 32. Further, in a second embodiment of the spring 62, as shown in FIG. 7, the first leg 66 and second leg 68 can be oriented on the central section 60 to extend outwardly from the central section 60 at an angle of approximately 90° with respect to one another. The increased angular distance between the first leg 66 and second leg 68 allows for an increase in the range and strength of the biasing force exerted by the spring 62 on the arm 38 of the pawl 32 to even further prevent slippage of the pawl 32 with respect to the teeth 40. The first leg 66 may also include a tab 69 disposed opposite the central portion 60. The tab 69 is insertable into an opening (not shown) in the channel 64 adjacent the nesting portion 30 of the slot 28 in order to ensure the proper positioning of the central portion 60 of the spring 62 within the pin hole 58 to allow easy insertion of the pin 56 through the central portion 60.

Figure 5:
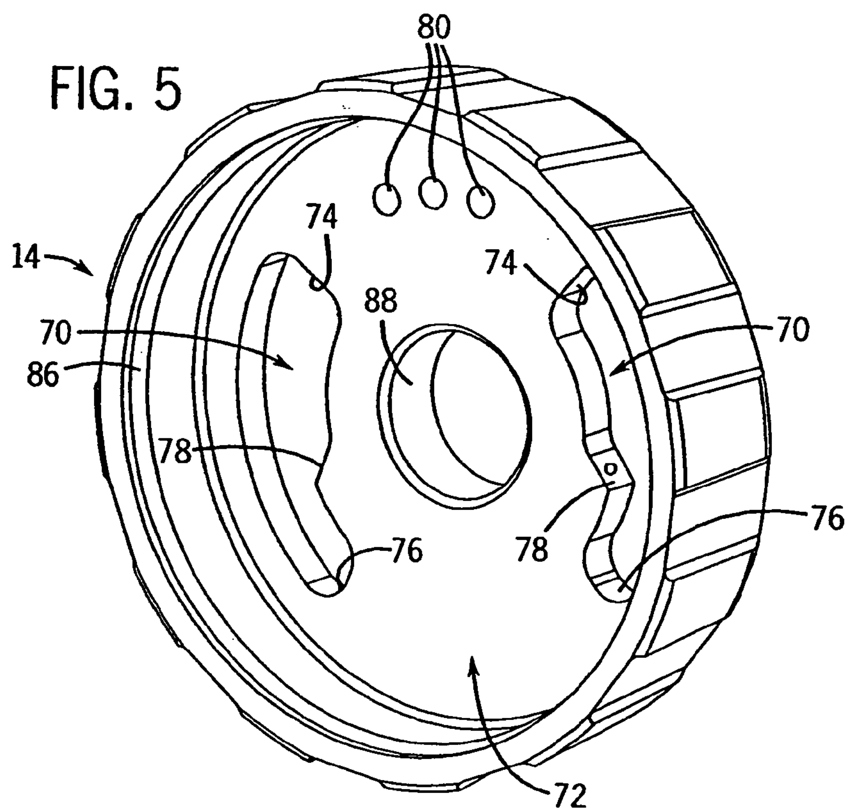
FIG. 5 is an isometric view of the cap of the ratcheting mechanism of FIG. 3.

Referring now to FIG. 5, the pawls 32 are maintained in or disengaged from the teeth 40 on the gear 44 by one of a pair of recesses 70 disposed on an interior surface 72 of the cap 14. Each recess 70 has a wide end 74, and a narrow end 76 that are separated by an inwardly extending ridge 78. The portion of each pawl 32 extending outwardly from the slots 28 is positioned within one of the recesses 70 on the cap 14 when the cap 14 is secured to the housing 20. When the cap 14 is rotated over the housing 20 such that a ridge 78 of one of the recesses 70 comes into contact with the adjacent pawl 32, the pawl 32 is urged out of the central opening 26 away from the teeth 40 against the bias of the biasing member 54 to a disengaged position, as shown best in FIG. 4. In this position, the gear 44 is allowed to rotate in a direction toward the disengaged pawl 32, as the opposite pawl 32 is configured to allow rotation in this direction, but to prevent any rotation in the opposite direction.

In order to assist an individual in properly positioning the cap 14 to enable the recesses 70 on the cap 14 to control the rotation of the gear 44 in one direction or the other, the cap 14 includes a number of depressions 80 disposed between the pair of recesses 70. Each of the depressions 80 is engageable with a spring-biased detent 82 positioned on the housing 20 between the pin holes 58. When the cap 14 is rotated, the detent 82 is compressed inwardly into an opening (not shown) disposed in the housing 20 that retains the detent 82 such that the cap 14 can rotate above the detent 82. However when one of the depressions 80 is positioned in alignment with the detent 82, a spring (not shown) positioned within the opening between the housing 20 and the detent 82 urges the detent 82 outwardly into engagement with the depression 80. The cap 14 is thus held in this position until such time as a sufficient force is applied by an individual to the cap 14 to disengage the depression 80 from the detent 82. Further, to prevent the cap 14 from being rotated past the outermost depressions 80, the wide end 74 of each recess 70 is configured to engage the outwardly extending end of each pin 56 which functions as a stop for the rotation of the cap 14 with respect to the housing 20.

The cap 14 can be rotatably secured to the exterior of the housing 20 in any conventional manner, but as shown in FIGS. 2 and 4, is preferably secured to the housing 20 by the engagement of a circumferential clip 84 disposed on the exterior of the wide end 22 of the housing 20 with a corresponding groove 86 disposed on the interior surface 72 of the cap 14. The engagement of the clip 84 and the groove 86 enables the cap 14 to rotate with respect to the housing 20 as necessary without disengaging the cap 14 from the housing, unless desired. Further, by engaging the clip 84 within the groove 86, a central opening 88 defined in the cap 14 is positioned in alignment with the central aperture 50 of the gear 44. Thus, the implement 16 can be inserted through the opening 88 in the cap 14 and into engagement with the aperture 50 in the gear 44 in order to be utilized with the ratcheting mechanism 18 of the tool 10. Also, to assist in rotating the cap 14, the cap 14 can be formed of any suitable material, such as a metal or a suitably rigid plastic, that can have added grip enhancements, such as knobs (not shown) or other high friction structures, or materials. However, preferably, the cap 14 includes a number of grooves 90 on the exterior surface 92 of the cap 14 that facilitate the gripping of the cap 14 by an individual and most preferably the exterior surface 92 of the cap 14 includes a knurled portion 94 as shown in FIGS. 6 and 7.

Various alternatives are contemplated as being within the scope of the following claims particularly pointing out and distinctly claiming the subject matter regarded as the invention.

I claim:

1. A ratcheting mechanism for a tool, the ratcheting mechanism comprising:

a) a housing including at least one slot, the at least one slot including a generally arcuate portion;

b) at least one pawl disposed in the at least one slot, the at least one pawl including a generally curved portion that is rotatably engaged within and retained by the generally arcuate portion of the at least one slot;

c) at least one biasing member engaged with the at least one pawl to bias the at least one pawl inwardly, the at least one biasing member including a pin; and d) a cap rotatably connected to the housing, the cap including at least one recess aligned within and disposed at least partially above the at least one slot in the housing, the at least one recess selectively engageable with the at least one pawl, and a stop surface engageable with the at least one pin to limit the rotation of the cap with respect to the housing.

2. The mechanism of claim 1 wherein the stop surface is located on the at least one recess.

3. The mechanism of claim 1 wherein the at least one biasing member includes a biasing element engaged between the pin and the at least one panel.

4. The mechanism of claim 3 wherein the biasing element includes a base portion engaged with the pin and at least one arm portion engaged with the at least one panel.

5. The mechanism of claim 4 wherein the biasing element is a spring.

6. A ratcheting mechanism for a tool, the mechanism comprising:

a) a housing including a first end and a second end, a central opening extending from the first end into the housing and a pair of pawl cavities spaced generally opposite one another, and at least one pin opening spaced from the pair of pawl cavities;

b) a pair of pawls moveably disposed within the pair of pawl cavities;

c) at least one pin inserted into the at least one pin opening;

d) at least one biasing element engaged with the at least one pin and operably engaged with the pawls;

e) a gear disposed within the central opening and having a number of teeth on an exterior surface that are selectively engageable with the pawls; and f) a cap rotatably engaged over the housing, the cap including a pair of recesses disposed at least partially above and engageable with the pawls and a stop surface engageable with the at least one pin to limit the rotation of the cap with respect to the housing.

7. The mechanism of claim 6 wherein the at least one biasing element includes a base portion engaged with the at least one pin and at least one arm portion extending outwardly from the base portion and engaged with the at least one of the panels.

8. A tool comprising:

a) a handle having a first end and a second end, a central opening extending into the handle from the first end, a central opening including a pair of slots on generally opposite sides of the central opening, each of the pair of slots having a generally arcuate nesting portion opposite the central opening, at least one pin hole located in the first end spaced from each of the pair of slots;

b) at least one pin disposed in the at least one pin hold;

c) at least one biasing element engaged with the at least one pin and extending from the at least one pin;

d) a pair of pawls rotatably disposed in the pair of slots and engaged with the at least one biasing element, each of the pair of pawls including a generally arcuate portion rotatably retained in the nesting portion and at least one arm extending outwardly from the arcuate portion;

e) a gear disposed in the central opening, the gear including a number of teeth located on an exterior surface of the gear and engageable with the at least one arm at each of the pair of pawls, the gear also including a central aperture disposed concentrically with the central opening;

f) a cap rotatably connected to the first end of the handle and including a central orifice aligned with the central aperture in the gear, a pair of generally opposed recesses aligned with and engageable with the pair of pawls, and a stop surface engageable with at least one pin to limit the rotation of the cap with respect to the handle.

9. The tool of claim 8 wherein the at least one biasing element includes a base portion connected to the at least one pin, and at least one arm portion engaged with one of the panels.

* * * * *